Oct. 6, 1936. L. A. MEKLER 2,056,732
PROTECTIVE LINING FOR VESSELS
Filed July 15, 1933
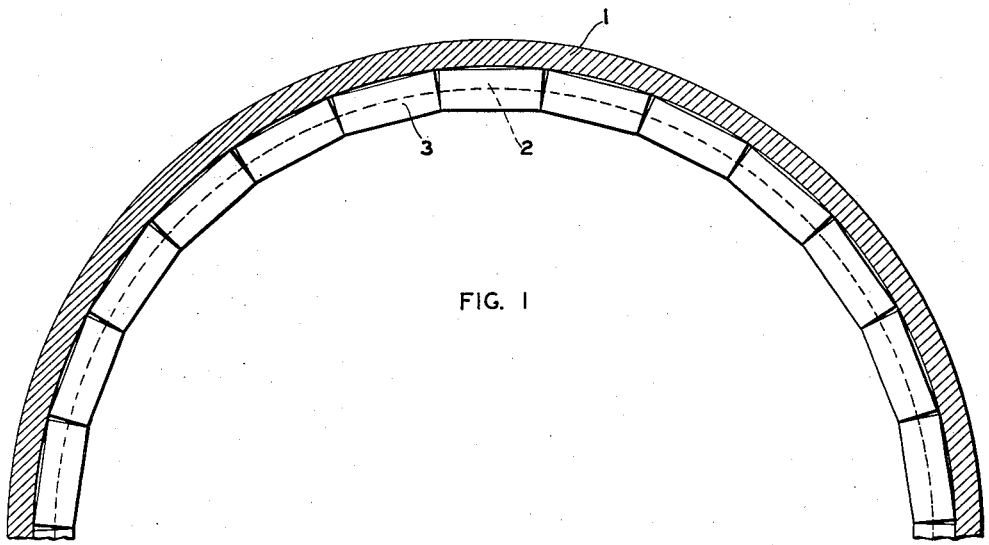
FIG. 1
FIG. 2
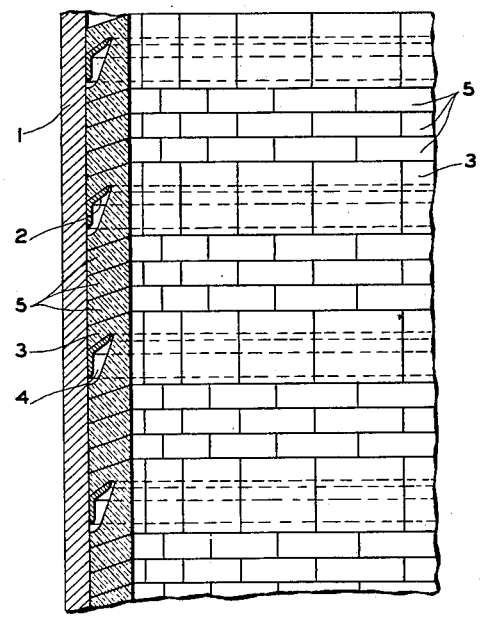
FIG. 3
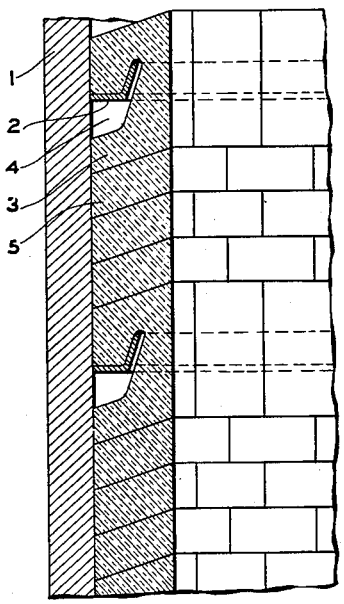
INVENTOR
LEV A. MEKLER
BY
ATTORNEY Patented Oct. 6, 1936

2,056,732

UNITED STATES PATENT OFFICE 2,056,732

PROTECTIVE LINING FOR VESSELS

Lev A. Mekler, Chicago, Ill., assignor to Universal Oil Products Company, Chicago, Ill., a corporation of Delaware Application July 15, 1933, Serial No. 680,643

4 Claims. (Cl. 220—63)

This invention refers to an improved type of protective lining for vessels particularly designed for protecting pressure vessels, for example, such as reaction chambers utilized in the pyrolytic conversion of hydrocarbon oils against corrosion, excessive heat, etc.

Several types of linings are now in use in the refining industry for protecting refining equipment from the corrosive action of sulphur compounds present in the oil undergoing treatment or formed during its treatment and/or from excessively high temperatures which decrease the strength of the steel walls of such equipment. Ceramic materials such as glazed or unglazed firebrick and other types of clay have been found suitable for this service but in practice it is necessary to hold this material in place by securing it to the walls of the vessel. This calls for the use of special shapes and I am aware that liners of this type have been proposed composed of ceramic blocks, each of which are held in place against the walls of the vessel to be lined by metallic members welded or otherwise fastened to the walls of the vessel and adapted to fit into slots or grooves in the blocks.

The present invention is concerned with improvements upon this type of lining by the provisions of which only a portion of the blocks comprising the lining are detachably fastened by metallic members to the walls of the vessel while other blocks which are not so secured to the walls of the vessel are held in place by the blocks so secured. More specifically, in accordance with the invention, the shape of the blocks detachably secured to the walls of the vessel is such that brick shapes of standard design may be employed as the unsecured blocks utilized in conjunction therewith. This not only reduces the cost of the lining, due to the smaller number of retaining members required to secure the lining to the walls of the vessel, but also permits the use of fewer special shapes and a large proportion of less expensive standard shapes. Another improvement over the prior art which is provided by the present invention resides in the simplicity and ease of installing the lining and also the ease with which any damaged portion thereof may be replaced without destroying the adjacent portions of the lining.

The various features and advantages of the invention will be more apparent by reference to the accompanying diagrammatic drawing and the following description thereof. The drawing illustrates how a lining of the type provided by the present invention may be installed on the inner surface of a cylindrical vessel. It will be understood, of course, that the invention is not limited to the use of a lining of the type provided by the present invention in any specific class of vessels nor is the invention limited to the specific form of lining illustrated, since other specific forms embodying the features outlined in the appended claims may be used.

Referring to the drawing Figure 1 is a sectional plan view of a portion of the vessel with the lining in place. Figure 2 is a sectional elevation of a portion of the same vessel and lining and Fig. 3 is an enlarged detail of a somewhat similar lining utilizing another type of retaining member for supporting the special liner blocks and retaining the lining in place against the walls of the vessel.

The wall of the vessel is indicated at 1. The vessel to be lined, in the case here illustrated, comprises a cylindrical vessel vertically disposed. Metallic angular rings 2 having, in the case here illustrated, an angle of over 90° between the legs are secured by welding, riveting or in any other suitable manner to the walls of the vessel around its inner circumference at spaced intervals in its height. These angle iron rings may, for example, be pressed or rolled from ordinary flat steel and shaped to conform to the curvature of the walls of the vessel or when employed as indicated in Fig. 3, standard 90° angle shapes may be employed, in which case only a rolling or bending operation is necessary to form the rings conforming to the shape of the vessel.

Special refractory shapes 3 comprising blocks of suitable corrosion and/or heat resistant material, for example, such as fire clay or the like or suitable silicious materials such as silicon carbide, aluminum silicate and the like having recesses or similar openings 4 on one face shaped to receive the angular retaining members 2 and held in place thereby against the wall 1 of the vessel form shaped horizontal rings around the inner circumference of the vessel.

That portion of the liner between the spaced horizontal rows of blocks 3 comprises one or a plurality of horizontal courses of blocks 5 preferably composed of the same material as blocks 3 but of standard shape.

It will be noted that the shape of blocks 3 and 5 is such that their upper and lower faces are not perpendicular to the surface of wall 1 of the vessel, the angle between the upper face and the wall being less than 90° and the angle between the lower face and the wall being more than 90°. This prevents the blocks 5 from slipping out of place against wall 1 while in service, as will be evident from the drawing, but permits their insertion and removal from between blocks 3 by withdrawing them at an angle corresponding to that of their upper and lower faces. Any desired number of courses of blocks 5 may be employed between adjacent rows of blocks 3 and the rows of blocks 3 may be uniformly or non-uniformly spaced, as desired.

It will be noted that the angle rings 2 in Fig. 2 have one leg parallel to wall 1 of the vessel while the upper surface of the other leg is at an angle less than 90° from the face of wall 1. This angle may be substantially the same or different than the angle between the upper surface of block 3 and the surface of wall 1, as desired, the principal difference being that if these angles are the same, blocks 3 may be inserted or withdrawn from between blocks 5 without removing the latter, while if the angle between the upper end of member 2 and wall 1 is less than that between the upper and lower surface of block 3 and wall 1, as shown in Fig. 2, it is necessary to remove the blocks in one course of blocks 5 immediately above block 3, in order to remove the latter. The latter arrangement gives a somewhat more rigid lining, however, replacements of a portion of the lining are not quite so easily made in the latter type as in the former.

Fig. 3 shows another form of angular retaining ring which does not permit removal of blocks 5 without removing some of blocks 3. The same numerical designation is used for the different parts in Fig. 3 as in Figs. 1 and 2.

It is within the scope of the present invention either to employ a suitable binder such as fire clay, high temperature furnace cement or the like between the adjacent surfaces of the blocks comprising the lining or to construct the liner without a binder between the joints. The latter practice has been found entirely suitable when the lining is installed, for example, in the reaction chamber of an oil cracking process in which coke is deposited. In such cases coke will normally fill the voids between the blocks during the first operation of the process and effectively seal the lining, rendering it substantially impervious during subsequent operations.

It will be understood that many modifications of the specific form of liner illustrated in the drawing may be employed without departing from the scope of the present invention. For example, the under surface of blocks 3 and the adjacent upper surface of blocks 5 may be perpendicular to the surface of wall 1. Also the inner and outer surfaces of blocks 5 need not necessarily be parallel to each other and/or to the surface of wall 1. Also instead of employing a 90° angle in the corners of the upper and lower surfaces of the blocks 3 and/or 5, as illustrated in Fig. 1, the blocks may be shaped to conform to the walls of the vessel with the adjoining edges of the blocks cut on a taper corresponding to the radius of the vessel so that there is no more space between adjacent faces of the blocks at the back than at the front of the lining. Also, when desired, instead of employing continuous angular rings around the entire inner circumference of the vessel, as illustrated in the drawing, clips comprising relatively short arcs or segments of a circle may be disposed at spaced intervals around the inner circumference of the chamber in the same horizontal plane. It is also specifically within the scope of the present invention instead of employing blocks such as 5 which may be slipped in or out of place without removing blocks 3 to employ an interlocking joint between the secured and the unsecured blocks or to employ secured blocks which overlap a portion of the unsecured blocks. It is also within the scope of the invention to employ T-bars or other standard or special structural shapes in place of the angular retaining members 2 and the courses of secured and unsecured blocks may be arranged, when desired, in vertical rows instead of horizontal rows, as illustrated. It is thought that these and other modifications of the structures illustrated will be apparent from the above description and they are therefore not shown in the drawing. It will be further understood that the various modifications mentioned are not considered equivalent to each other or to the structure illustrated but that each may have advantages in specific installations. However, the preferred form, in most cases, is that illustrated in the drawing.

I claim as my invention:

1. In a protective covering for the internal walls of a vessel, comprising a plurality of pre-formed corrosion-resistant blocks, the improvement which comprises, in combination, spaced blocks secured to the walls of said vessel, and adjacently associated blocks removably retained in place by frictional engagement with the opposed edges of said secured blocks.

2. A protective covering for the walls of a vessel, comprising in combination, a plurality of pre-formed lining members of corrosion-resistant material detachably secured to the internal walls of said vessel and arranged in parallel, spaced rows, and interposed rows of additional and removable lining members in association with said secured members, adapted to be retained on said internal walls through frictional engagement with the opposed edges of said secured members.

3. In combination, a vessel, a plurality of annular, spacedly disposed retaining members secured to the internal surface of said vessel, a plurality of pre-formed, corrosion resistant blocks having receptive recesses for said retaining members disposed over said retaining members and over a portion of said internal surface, and a further plurality of pre-formed corrosion-resistant blocks adjacently disposed relative to said recessed blocks over the balance of said internal surface, and retained in place by the contiguously contacting edges of said recessed blocks.

4. A protective covering for the walls of a vessel comprising a plurality of associated preformed blocks of corrosion resistant material, a portion of said blocks being secured to the walls of said vessel with the upper surfaces of said blocks at an acute angle with respect to said walls, and a portion thereof resting upon the upper surfaces of said secured blocks and supported thereby.

LEV A. MEKLER.